US 11,251,610 B2

(12) United States Patent
Ait Mahrez et al.

(10) Patent No.: US 11,251,610 B2
(45) Date of Patent: Feb. 15, 2022

(54) CONTROL SYSTEM FOR A POWER GENERATION SYSTEM

(71) Applicant: GENERAL ELECTRIC TECHNOLOGY GMBH, Baden (CH)

(72) Inventors: Camal Ait Mahrez, Massy (FR); Guillaume Depreville, Massy (FR)

(73) Assignee: General Electric Technology GmbH, Baden (CH)

( * ) Notice: Subject to any disclaimer, the term of this patent is extended or adjusted under 35 U.S.C. 154(b) by 375 days.

(21) Appl. No.: 16/609,522

(22) PCT Filed: Mar. 20, 2018

(86) PCT No.: PCT/EP2018/057062
§ 371 (c)(1),
(2) Date: Oct. 30, 2019

(87) PCT Pub. No.: WO2018/177823
PCT Pub. Date: Oct. 4, 2018

(65) Prior Publication Data
US 2020/0099221 A1 Mar. 26, 2020

(51) Int. Cl.
*H02J 1/10* (2006.01)
*G05B 11/36* (2006.01)
*G05B 17/02* (2006.01)

(52) U.S. Cl.
CPC ............... *H02J 1/10* (2013.01); *G05B 11/36* (2013.01); *G05B 17/02* (2013.01)

(58) Field of Classification Search
CPC .......... H02J 1/10; H02J 2310/12; H02J 1/102; H02J 1/106; G05B 11/36; G05B 17/02
See application file for complete search history.

(56) References Cited

U.S. PATENT DOCUMENTS

| 8,417,980 B1 | 9/2013 | Memberg |
| 2012/0033450 A1 | 9/2012 | Shih et al. |

(Continued)

OTHER PUBLICATIONS

International Search Report of PCT/EP2018/057062 dated Jun. 19, 2018.

(Continued)

*Primary Examiner* — Tejal Gami
(74) *Attorney, Agent, or Firm* — Eversheds Sutherland (US) LLP (57) ABSTRACT

The invention lies in the field of current stabilisation in a power generation system comprising a plurality of elementary power groups connected in parallel. It relates to a control system for regulating the elementary power groups. According to the invention, the control system comprises a global current control system (510) and a plurality of local current control systems each associated with an elementary power source of the power generation system. The global current control system (510) comprises: ■ a divider (511) arranged to deliver a fixed current set point $I_{n\_fix}$, ■ correction unit (512) arranged to deliver a variable current set point $I_{n\_var}$ and to take either a steady state or a transitory state, the variable current set point $I_{n\_var}$ being determined as a function of a correction signal $S_{corr}$ in the transitory state, ■ an adder (513) arranged to deliver a global current set point $I_{n\_glob}$ as the sum of the fixed current set point $I_{n\_fix}$ and the variable current set point $I_{n\_var}$, and ■ a scenario management unit (514) arranged to detect when the state of at least one elementary power source ($220_1$-$220_N$) switches from an OFF-state to an ON-state, or vice versa, to determine the correction signal $S_{corr}$ and to trigger the transitory state of the correction unit for a predetermined transitory period $\tau_{trans}$ when a change of state is detected.

14 Claims, 6 Drawing Sheets

(56) References Cited

U.S. PATENT DOCUMENTS

2014/0049108 A1  2/2014  Hsu et al.
2016/0134108 A1  12/2016 Hung et al.

OTHER PUBLICATIONS

European Search Report for Application No. 17290045.8 dated Sep. 19, 2017.

CONTROL SYSTEM FOR A POWER GENERATION SYSTEM

CROSS-REFERENCE TO RELATED APPLICATIONS

This application is a U.S. National Stage Application under 35 U.S.C. 371 and claims the priority benefit of International Application No. PCT/EP2018/057062 filed Mar. 20, 2018, which claims priority to EP17290045.8, filed Mar. 28, 2017, which are both incorporated herein by reference.

TECHNICAL FIELD

The invention lies in the field of current stabilisation in a power generation system comprising a plurality of elementary power groups connected in parallel. It relates to a control system for regulating the elementary power groups. It also relates to a power system comprising the power generation system and the control system.

The invention is of particular interest for aluminium electrolysis but it is more generally applicable to any power generation system wherein the elementary power sources are each regulated on the basis of a reference current set point and may be independently switched off.

BACKGROUND OF THE INVENTION

Aluminium electrolysis requires the generation of direct current with very high amperage, in the order of several thousands of kilo-amperes (kA). The current is provided to multiple pots electrically connected in series. It must remain stable during all the process in order to ensure the required quality of production. As a consequence, the current is generally provided by a power station comprising a plurality of elementary power sources electrically connected in parallel and a control system for regulating them. The elementary power sources each deliver an elementary current, the sum of which forms a so-called total current that is delivered to the pots. The elementary power sources are regulated by the control system so that the total current follows the required current, referred to as a total current set point. The control system may comprise a global current control system and a plurality of local current control systems each associated with an elementary power source. The global current control system is arranged to deliver a common set point for all elementary power sources. This common set point is referred to as a global current set point. It is determined as a function of the total current set point, the number of elementary power sources delivering an elementary current, and the difference between the total current and the total current set point. Each local current control system performs a closed-loop control of the elementary current of one of the elementary power sources on the basis of a set point, in general the global current set point. Nevertheless, for various reasons, some elementary power sources may be regulated around a different set point, referred to as a local current set point.

In addition to the need of stability, the total current delivered to the pots should never be stopped except for short periods of time, for instance for maintenance. In case of long-term stopping, the pots are likely to be spoiled. Then, in order to allow at least one elementary power supply to be stopped at a time, while maintaining a constant current for aluminium production, the power station is fitted with an increased number of elementary power sources, their power capacity being designed so as to be able to deliver the required total current.

When an elementary power source is to be switched off, the intensity of its elementary current is gradually decreased to zero. The control system is able to compensate for this gradual decrease by increasing accordingly the current set point delivered to each remaining elementary power source. However, when the elementary power source is switched off, the total current undergoes an important disturbance that cannot be appropriately compensated for by the control system for several seconds. In practice, the total current may depart from the total current set point for more than 10 kilo-amperes. This disturbance originates from the fact that the global current set point is partly defined on the basis of the number of elementary power sources delivering an elementary current. Yet, this number is suddenly modified when the elementary power source is switched off. Correct regulation will only be recovered when the global current set point will be adjusted to take into account the actual difference between the total current and the total current set point. Similar disturbance is also generated when an elementary power source changes from the off-state to the on-state.

Up to now, disturbances of this type are not addressed. One aim of the invention is to provide a solution for minimizing and, if possible, removing disturbances in the total current due to the change of state of one or several elementary power sources.

SUMMARY OF THE INVENTION

With this respect, the invention lies on the principle according to which the change of state of the elementary power sources is continuously monitored and, when a change is detected, the regulation of the elementary currents is temporarily forced to a derogatory regime so as to keep the total current constant. According to a first branch of the invention, the global regulation of the elementary power sources is interrupted for a transitory period and each elementary power source is locally regulated on the basis of a theoretical signal. This theoretical signal is determined to correspond to the global current set point that would be determined in a steady state with no disturbance. According to a second branch of the invention, the global regulation of the elementary power sources is not interrupted, but it is offset by a correction signal. This correction signal is determined so as to represent the gap between the global current set point before the change of state of at least one elementary power source and the global current set point after that change.

More precisely, an object of the invention is a control system for regulating a plurality of elementary power groups in a power generation system, each elementary power group comprising an elementary power source arranged to take either an ON-state, wherein it generates an elementary current $I_n$, or an OFF-state, wherein it is not able to provide a current, the elementary power sources being connected in parallel to deliver a total current $I_{tot}$ as a sum of the elementary currents $I_n$, the control system comprising a global current control system and a plurality of local current control systems each associated with an elementary power source, the global current control system being arranged to generate a global current set point $I_{n\_glob}$, each local current control system being arranged to work either in a global mode, wherein it regulates the elementary current $I_n$ of the associated elementary power source as a function of said global current set point $I_{n\_glob}$, or in a local mode, wherein it regulates said elementary current $I_n$ as a function of a predetermined local current set point $I_{n\_loc}$, the global current control system comprising:

a divider arranged to deliver a fixed current set point $I_{n\_fix}$, the fixed current set point $I_{n\_fix}$ being equal to a total current set point $I_{tot\_ref}$ divided by a number $N_{ON}$ of elementary power sources in the ON-state, a correction unit arranged to deliver a variable current set point $I_{n\_var}$ and to take either a steady state, wherein the variable current set point $I_{n\_var}$ is determined as a function of a difference between the total current $I_{tot}$ and a total current set point $I_{tot\_ref}$ so as to minimise said difference, or a transitory state, wherein the variable current set point $I_{n\_var}$ is determined as a function of a correction signal $S_{corr}$, an adder arranged to deliver the global current set point $I_{n\_glob}$, the global current set point being equal to the sum of the fixed current set point $I_{n\_fix}$ and the variable current set point $I_{n\_var}$, and a scenario management unit arranged to detect a change of scenario from a former scenario to a new scenario, a change of scenario occurring when the state of at least one elementary power source switches from the OFF-state to the ON-state, or vice versa, the scenario management unit being further arranged to determine the correction signal $S_{corr}$, to deliver it to the correction unit and to trigger the transitory state of the correction unit for a predetermined transitory period $\tau_{trans}$ when a change of scenario is detected, the correction signal $S_{corr}$ being determined so that the total current $I_{tot}$ remains constant in spite of the change of scenario.

The power generation system typically comprises a total of N elementary power groups. Each elementary power group comprises an elementary power source. Each elementary power source is able to deliver, in the ON-state, an elementary current $I_n$ in a predetermined range of values. Subscript n indicates the elementary power source whose elementary current is referred to. The upper limit of the predetermined range of values is for instance 100 kA. The lower limit of the predetermined range of values is preferably zero. This means that in the ON-state, an elementary power source may deliver no current. In the OFF-state, the elementary power sources are not able to deliver a current. The number of elementary power sources in the ON-state is referred to as $N_{ON}$. It may be any integer equal or superior to 3. Each elementary power source may comprise, in addition to an elementary power source, means for measuring its elementary current $I_n$. Other components may be included in each elementary power group.

The control system comprises a global current control system and a local current control system associated to each elementary power source. The global current control system is arranged to generate a global current set point $I_{n\_glob}$. In a steady state, the global current set point $I_{n\_glob}$ is determined as a function of the fixed current set point $I_{tot\_ref}$ corresponding to the desired total current, the total current $I_{tot}$ actually delivered by the power generation system and the number $N_{ON}$ of elementary power sources in the ON-state. Each local current control system regulates the elementary current $I_n$ of the elementary power source to which it is associated on the basis of a current set point. For instance, the elementary current $I_n$ is regulated so as to be equal to this current set point $I_{n\_glob}$. Alternatively, a factor may be introduced between the elementary current $I_n$ and the current set point. Each local current control system is arranged to work either in a global mode, wherein the global current set point $I_{n\_glob}$ is used as the current set point, or in a local mode, wherein a predetermined local current set point $I_{n\_loc}$ is used as the current set point. A local current set point is for instance determined by an operator. The number of elementary power sources in the ON-state associated with a local current control system working in the global mode is referred to as $N_{ON\_glob}$. The number of elementary power sources in the ON-state associated with a local current control system working in the local mode is referred to as $N_{ON\_loc}$.

In the present description and in the following claims, each physical quantity, such as the elementary currents $I_n$, the global current set point $I_{n\_glob}$ and the correction signal $S_{corr}$, is generally referred to without reference to time for ease of reading. However, all physical quantities are likely to vary with time. Then, they are also equally referred to with the time variable, for instance $I_n(t)$, $I_{n\_glob}(t)$ and $S_{corr}(t)$, respectively.

The control system and more particularly the global current control system and the local current control systems may work with analog signals and/or digital signals. In the last case, each measured signal such as the total current $I_{tot}$ and the elementary currents $I_n$ are digitized. Analog and/or digital circuits may be used accordingly. The global current control system and each local current control system may comprise a Field Programmable Gate Array (FPGA), a processor, a microprocessor, a controller and/or a microcontroller. In the global current control system, the divider, the correction unit, the adder and the scenario management unit may be carried out by distinct analog or digital components or by a single component, for example a microprocessor. Some or all local current control systems may be embodied in a single component. In addition, the global current control system may be embodied in a component together with one or several local current control systems.

According to the first branch of the invention, the global regulation of the elementary power sources is interrupted for the transitory period $\tau_{trans}$ and each elementary power source is locally regulated on the basis of a theoretical signal, namely the correction signal $S_{corr}$.

In a particular embodiment, in the transitory state of the correction unit, the variable current set point $I_{n\_var}$ delivered by the correction unit is determined as being equal to the correction signal $S_{corr}$. In other words, the variable current set point $I_{n\_var}$ is transitory replaced by the correction signal $S_{corr}$.

In a first embodiment, the scenario management unit is arranged to determine the correction signal $S_{corr}$ as follows:

$$S_{corr} = \sum_{n=1}^{N_{ON}} \left( \frac{I_{tot\_ref}}{N_{ON}} - I_n \right) \Big/ (N_{ON} - N_{ON\_loc})$$

with $N_{ON\_loc}$ the number of elementary power sources in the ON-state in the new scenario associated with a local current control system working in a local mode.

Quantity $I_{tot\_ref}/N_{ON}$ corresponds to the fixed current set point $I_{n\_fix}$. Quantity $(N_{ON}-N_{ON\_loc})$ represents the number of elementary power groups in the ON-state associated with a local current control system in the global mode. This quantity is equally referred to as $N_{ON\_glob}$. The correction signal $S_{corr}$ may so be written as follows:

$$S_{corr} = \sum_{n=1}^{N_{ON}} (I_{n\_fix} - I_n) / N_{ON\_glob}$$

Then, the correction signal $S_{corr}$ is determined by taking into account the difference between the fixed current set point $I_{n\_fix}$ and the elementary current $I_n$ for all elementary power sources. The sum of these differences is divided by $N_{ON\_glob}$ so as to "spread" the correction between all elementary power sources associated with a local current control system working in the global mode.

Since the difference between the fixed current set point $I_{n\_fix}$ and the elementary current $I_n$ is nearly zero for elementary power sources associated with a local current control system in the global mode, it is possible not to take them into account. Then, in a second embodiment, the scenario management unit may be arranged to determine the correction signal $S_{corr}$ as a function of the differences, for each elementary power group in the ON-state associated with a local current control system working in the local mode, between its elementary current $I_n$ and the fixed current set point $I_{n\_fix}$ in the new scenario.

More particularly, the correction signal $S_{corr}$ may be determined as follows:

$$S_{corr} = \sum_{n=1}^{N_{ON\_loc}} \left( \frac{I_{tot\_ref}}{N_{ON}} - I_n \right) / (N_{ON} - N_{ON\_loc})$$

Or $$S_{corr} = \sum_{n=1}^{N_{ON\_loc}} (I_{n\_fix} - I_n) / N_{ON\_glob}$$

It may be observed that in case all elementary power sources are working in the global mode ($N_{ON\_loc}=0$), i.e. are associated with local current control system in the global mode, the correction signal $S_{corr}$ is determined as being null. This does not mean that, in practice, all elementary currents $I_n$ will be equal to $I_{tot\_ref}/N_{ON}$, but that the sum of differences $(I_{tot\_ref}/N_{ON})-I_n$ should indeed be zero.

The correction signal $S_{corr}$ may be determined with elementary currents $I_n$ considered at the switching time. Nevertheless, due to the response time of the power generation system and the control system, the elementary currents $I_n$ may also be considered just before or just after this switching time. The correction signal $S_{corr}$ may then remain the same during the whole transitory period $\tau_{trans}$.

The transitory period $\tau_{trans}$ wherein the correction signal $S_{corr}$ is taken into account when determining the global current set point $I_{n\_glob}$ ranges for example between 5 milliseconds and 1 second. This period actually depends on the inertia of the power generation system and the control system.

According to a second branch of the invention, the global regulation of the elementary power sources is not interrupted, but it is offset by a correction signal. With respect to the first branch of the invention, the second branch has the advantage of maintaining regulation at all time. As a result, in case of a current variation due to another reason than a change of state of an elementary power source, the control system will still be able to compensate for that change so that the total current $I_{tot}$ remains equal or nearly equal to the total current set point $I_{tot\_ref}$. In a particular embodiment of this second branch, in the transitory state of the correction unit, the variable current set point $I_{n\_var}$ is determined as being equal to the sum of the correction signal $S_{corr}$ and the difference between the total current $I_{tot}$ and the total current set point $I_{tot\_ref}$.

The correction signal $S_{corr}$ relied on in the second branch is determined differently to that in the first branch. For example, in the transitory state of the correction unit, the correction signal $S_{corr}$ may be determined so as to be equal to the difference between the fixed current set point $I_{n\_fix}(t)$ for the new scenario and the fixed current set point $I_{n\_fix}(t-1)$ for the former scenario.

In the steady state of the correction unit, i.e. in absence of any change in the state of the elementary power sources, the correction signal $S_{corr}$ may be determined as being equal to zero.

Both in the first and the second branch of the invention, digital signals may be used. The measured signals, i.e. the total current $I_{tot}$ and the elementary currents $I_n$, are digitized at a predetermined sampling frequency. This sampling frequency advantageously determines the frequency of data processing. In particular, the sampling frequency may set the frequency at which the global current set point $I_{n\_glob}$ is determined. In other words, the global current control system may be arranged to generate the global current set point $I_{n\_glob}$ at a predetermined sampling frequency.

In the second branch of the invention, the transitory period $\tau_{trans}$ is advantageously equal to a sampling period corresponding to the sampling frequency. In other words, the correction signal $S_{corr}$ is added to the difference between the total current $I_{tot}$ and the total current set point $I_{tot\_ref}$ only for a single sample.

Another object of the invention is a power system comprising the power generation system and the control system described above. The power generation system so comprises a plurality (N) of elementary power groups each associated with one of the local current control systems of the control system.

The power generation system may be dedicated to deliver the total current $I_{tot}$ to a smelter, for example an aluminium smelter. More precisely, the total current $I_{tot}$ may be delivered to multiple pots electrically connected in series.

BRIEF DESCRIPTION OF THE DRAWINGS

The invention will be best understood in view of the foregoing description of exemplary embodiments, which are in no way limitative, and in view of the accompanying drawings, on which.

DETAILED DESCRIPTION OF DETAILED EMBODIMENTS

Figure 1:
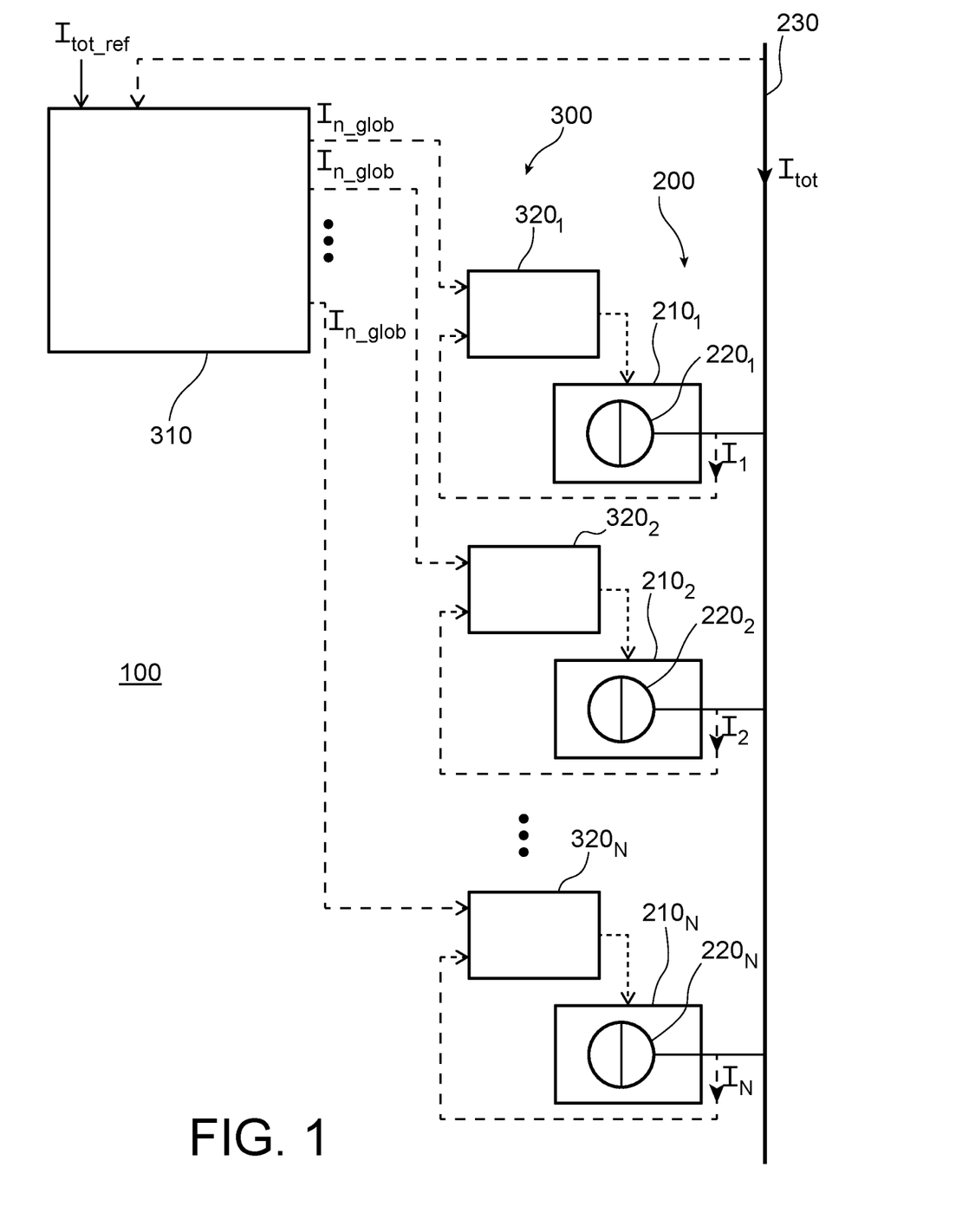
FIG. 1 represents an embodiment of a power system comprising a power generation system and a control system.

FIG. 1 represents an embodiment of a power system 100 comprising a power station or power generation system 200 and a control system 300. The power generation system 200 enables generating a direct current with high amperage, for instance of several thousands of kilo-amperes. It comprises a number N of elementary power groups 2101, 2102, ..., 210N, with N an integer greater than or equal to 2. In the present description, the elementary power groups are collectively referred to by reference numeral 210 and are individually referred to by reference numeral 210n, with n an integer varying between 1 and N. The same numbering applies to other components of the power system 100, each component being linked to one of the elementary power groups 210. Each elementary power group 210n comprises an elementary power source 220n able to take either an ON-state, wherein it generates an elementary current $I_n$, or an OFF-state, wherein it is not able to provide a current. Each elementary power group 210n further comprises means for measuring its elementary current $I_n$, not represented, for instance an ammeter. The elementary power groups 210 are electrically connected to a power line 230 so that the current $I_{tot}$ on the power line 230 is equal to the sum of the elementary currents $I_n$.

The control system 300 comprises a global current control system 310 and N local current control systems 3201-320N, each local current control system 320n being associated with an elementary power group 210n and more particularly with an elementary power source 220n. The global current control system 310 is arranged to generate a global current set point $I_{n\_glob}$ that may be used locally by each of the elementary power groups 210 as a reference set point. In a first embodiment, illustrated on FIG. 1, the global current set point $I_{n\_glob}$ is common to all elementary power groups 210. In a second embodiment, a global current set point $I_{n\_glob}$ may be determined for each of the elementary power groups 210. Each local current control system 320n is arranged to work either in a global mode, wherein it regulates the elementary current $I_n$ of the associated elementary power source as a function of said global current set point $I_{n\_glob}$, or in a local mode, wherein it regulates the elementary current $I_n$ as a function of a predetermined local current set point $I_{n\_loc}$. Predetermined local current set points are typically determined by an operator. The local current control systems 320 may be proportional-integral (PI) controllers or proportional-integral-derivative (PID) controllers or any other controllers based on these controllers. Each local current control system 320n receives the elementary current $I_n$ delivered by its associated elementary power group 210n and at least one of the global current set point $I_{n\_glob}$ and the local current set point $I_{n\_loc}$. It may control the elementary power group 210n so that its elementary current $I_n$ is equal to the current set point $I_{n\_glob}$ or $I_{n\_loc}$.

Figure 2:
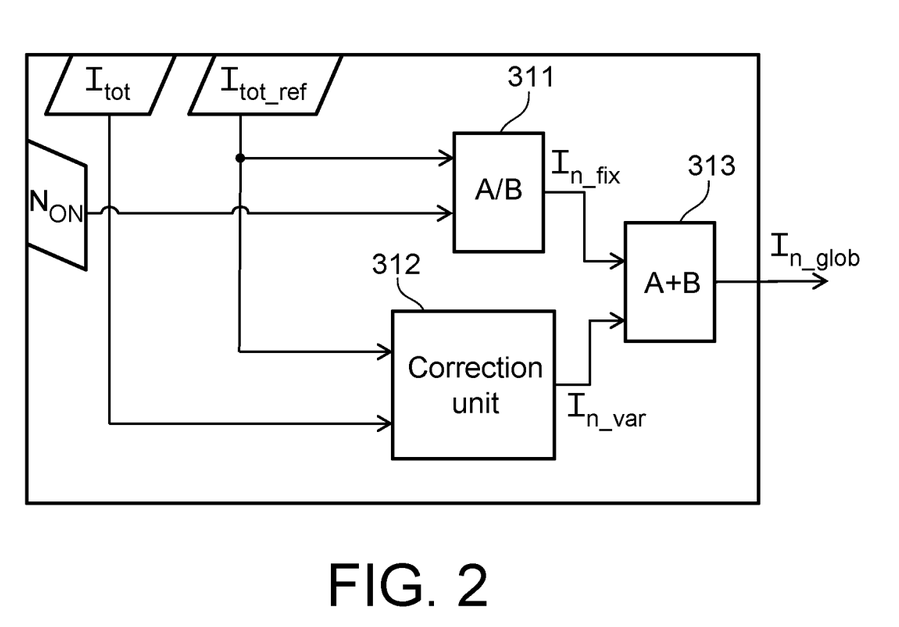
FIG. 2 represents an exemplary embodiment of a global current control system of the control system of FIG. 1.

FIG. 2 represents an exemplary embodiment of the global current control system 310. This global current control system 310 comprises a divider 311, a correction unit 312 and an adder 313. It receives the total current $I_{tot}$ on the power line 230 and a total current set point $I_{tot\_ref}$, for instance set up by an operator. The global current control system 310 also receives information relating to the number $N_{ON}$ of elementary power sources in the ON-state.

Alternatively, it may comprise means for determining this number $N_{ON}$. The total current set point $I_{tot\_ref}$ and the number $N_{ON}$ of elementary power sources in the ON-state are input to the divider 311 so that it delivers a fixed current set point $I_{n\_fix}$ equal to the total current set point $I_{tot\_ref}$ divided by the number $N_{ON}$ of elementary power sources in the ON-state:

$$I_{n\_fix} = I_{tot\_ref}/N_{ON}$$

The correction unit 312 receives the total current $I_{tot}$ and the total current set point $I_{tot\_ref}$, compares them and delivers a variable current set point $I_{n\_var}$ as a function of this comparison in order to minimise the deviation of the total current $I_{tot}$ with respect to the total current set point $I_{tot\_ref}$. The correction unit 312 may be a proportional-integral (PI) controller or a proportional-integral-derivative (PID) controller.

The adder 313 receives the fixed current set point $I_{n\_fix}$ and the variable current set point $I_{n\_var}$ and delivers the global current set point $I_{n\_glob}$ as the sum of these currents:

$$I_{n\_glob} = I_{n\_fix} + I_{n\_var}$$

Figure 3:
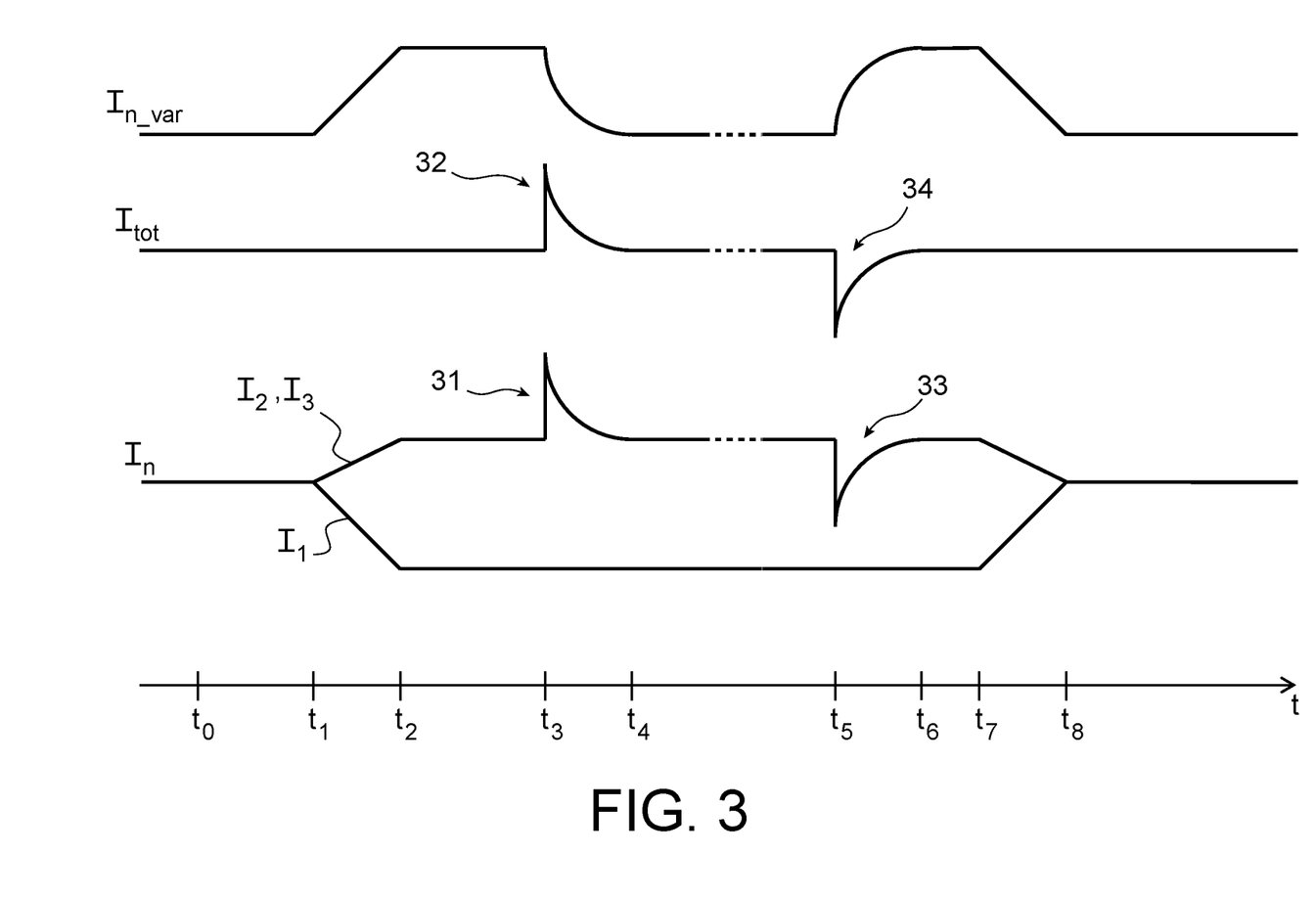
FIG. 3 is a timing diagram illustrating how the power system of FIG. 1 functions.
Figure 4:
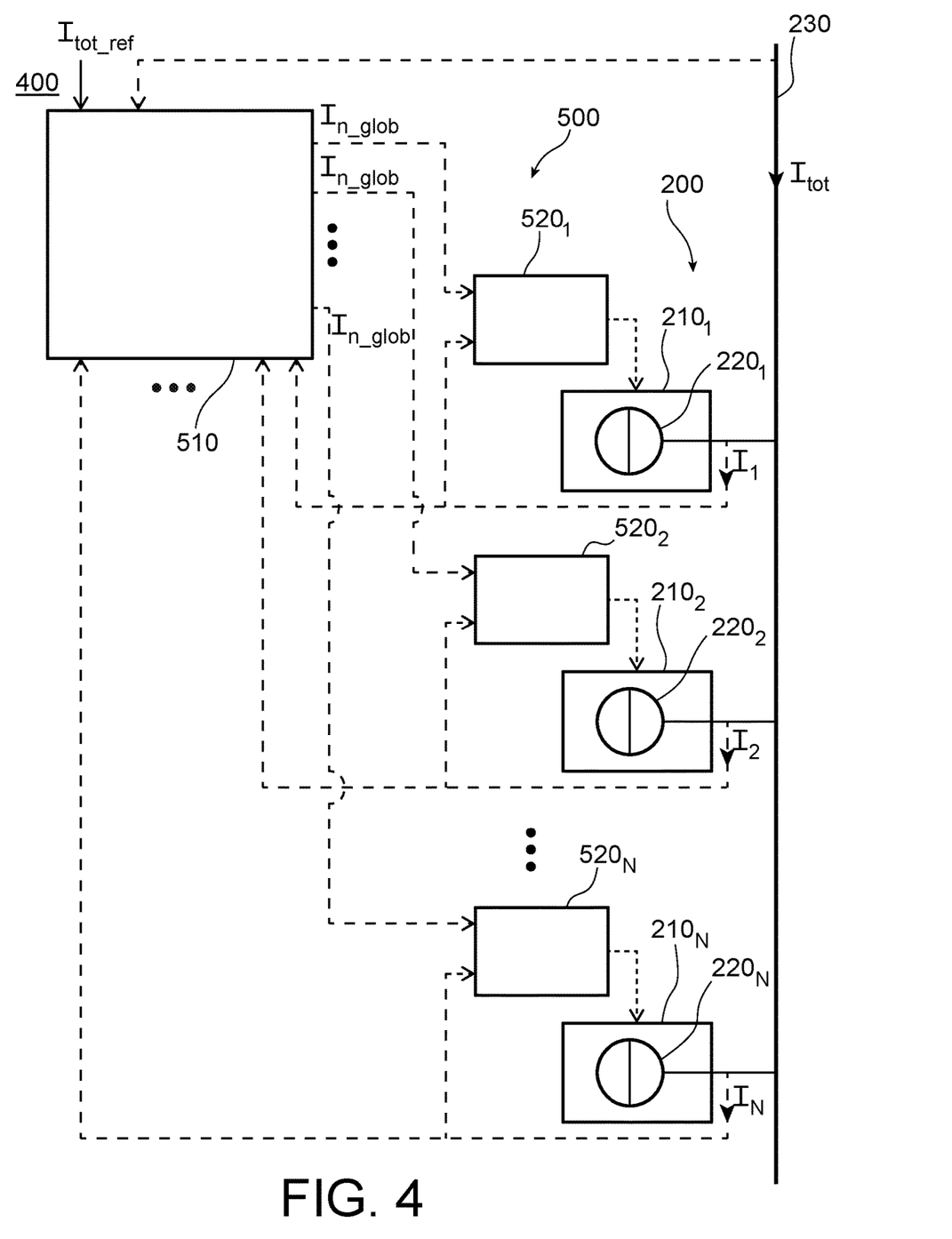
FIG. 4 represents a power system according to a first embodiment of the invention comprising the power generation system of FIG. 1 and a control system according to the invention.

FIG. 3 is a timing diagram illustrating how the power system 100 as described above functions. Time t is represented in abscissa and the intensity of each current is represented in ordinate. Note that the intensity scale is not the same for all currents but only aims at showing time evolution of each current with respect to the others. For this figure, it is considered a power generation system 200 with three elementary power groups 210 (N=3), dedicated to deliver a total current of 300 kA ($I_{tot\_ref}$=300 kA). It is assumed that at time t0, the elementary power sources 220 of all elementary power groups 210 are in the ON-state and each generate a same elementary current $I_n$ ($I_n = I_1 = I_2 = I_3 = 100$ kA). For some reasons, it is desired to stop the elementary power group 2101 for a certain period. Then, at time $t_1$, elementary current $I_1$ starts to decrease until it reaches zero at time $t_2$. This decrease is for example managed by setting a predetermined decreasing local current set point $I_{1\_loc}$. The decrease of $I_1$ leads the total current $I_{tot}$ to show a decrease tendency. However, this decrease of $I_{tot}$ is evaluated by the correction unit 312, which leads the variable current set point $I_{n\_var}$ to increase accordingly. The global current set point $I_{n\_glob}$ increases in the same way between $t_1$ and $t_2$. The variable current set point $I_{n\_var}$ rises from 0 to 50 kA and the global current set point $I_{n\_glob}$ rises from 100 kA to 150 kA. As can be seen on FIG. 3, the gradual decrease of the elementary current $I_1$ is compensated for by the control system 300 without any disturbance. However, when at time $t_3$ the elementary power source 2201 switches from the ON-state to the OFF-state, the number $N_{ON}$ of elementary power sources in the ON-state suddenly changes from 3 to 2. This leads to a sudden change of the fixed current set point $I_{n\_fix}$ from 100 kA to 150 kA. The global current set point $I_{n\_glob}$ also suddenly changes from 150 kA to 200 kA. The local current control systems 3202 and 3203 are not able to compensate for this change of current set point and make the elementary power sources 2202 and 2203 to generate a current peak 31 at time $t_3$ lasting several seconds. This current peak 31 will gradually decrease until time $t_4$ at which the correction unit 312 fully compensates for the difference between the total current $I_{tot}$ and the total current set point $I_{tot\_ref}$. The current peak 31 is of course passed on to the total current $I_{tot}$, which so shows a current peak 32. A similar effect is observed when an elementary power source 220n switches from the OFF-state to the ON-state, whereas at least one other elementary power source is delivering a no-null elementary current $I_n$. In particular, in the example of FIG. 3, when the elementary current source 2201 is switched in the ON-state at time $t_5$, the number $N_{ON}$ of elementary elements in the ON-state now suddenly changes from 2 to 3. This leads to a sudden change of the global current set point $I_{n\_glob}$ that the local current control systems 3201, 3202, 3203 are not able to compensate for instantaneously. It results a current peak 33 for the elementary currents $I_2$ and $I_3$ and so a current peak 34 for the total current $I_{tot}$. The current peaks 33 and 34 gradually decrease until time $t_6$ at which the correction unit 312 fully compensates for the difference between the total current $I_{tot}$ and the total current set point $I_{tot\_ref}$. At time $t_7$, the elementary current $I_1$ starts to increase until it reaches the same current as elementary currents $I_2$ and $I_3$ at time $t_8$ ($I_1=I_2=I_3=100$ kA). The increase of the elementary current $I_1$ leads the variable current set point $I_{n\_var}$ to decrease accordingly from 50 KA to 0. As a result, the elementary currents $I_2$ and $I_3$ also decrease from 150 kA to 100 kA. FIG. 4 represents a power system 400 according to a first embodiment of the invention. It comprises the power generation system 200 as disclosed above with reference to FIG. 1 and a control system 500. The control system 500 also comprises a global current control system 510 and N local current control systems 520, each local current control system 520n being associated with an elementary power group 210n. With respect to the power system 100 of FIG. 1, the power system 400 according to an embodiment of the invention distinguishes in that the global current control system 510 is provided with the elementary currents $I_n$ of all elementary power sources 220. The global current control system 510 is also arranged to generate a global current set point $I_{n\_glob}$ that may be used locally by each of the elementary power groups 320 as a reference set point. The global current set point $I_{n\_glob}$ may be common to all elementary power groups 320 or may be individual for each elementary power group 320n.

Figure 5:
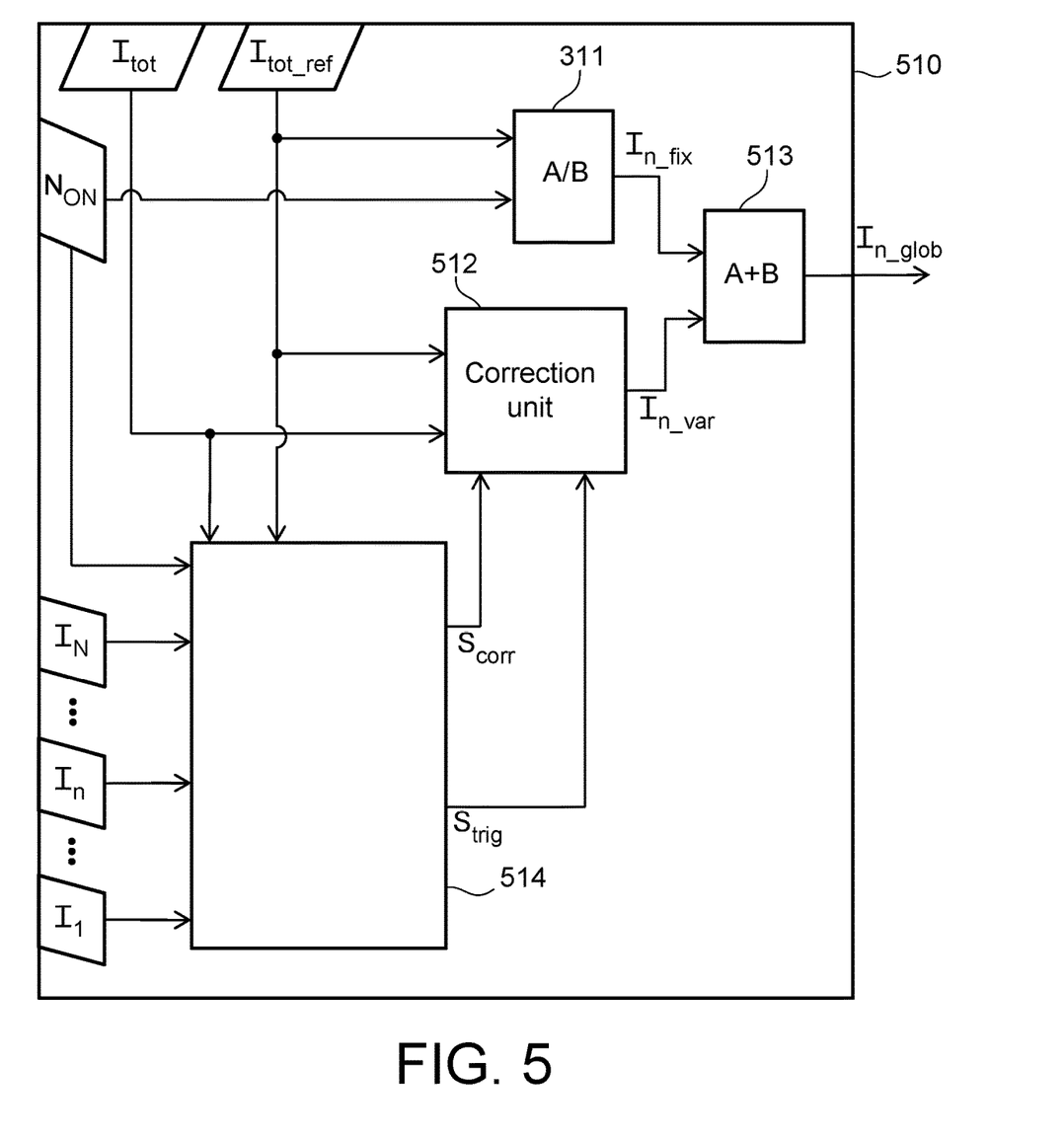
FIG. 5 represents an exemplary embodiment of a global current control system of the control system of FIG. 4.

FIG. 5 represents an exemplary embodiment of the global current control system 510. Similarly to the global current control system 310, it comprises a divider 511, a correction unit 512 and an adder 513. In addition, it comprises a scenario management unit 514 receiving each elementary current $I_n$, the total current set point $I_{tot\_ref}$ and the number $N_{ON}$ of elementary power sources 220 in the ON-state. This number $N_{ON}$ could alternatively be determined by the global current control system 510 itself. The scenario management unit 514 may further receive the total current $I_{tot}$, for instance in view to be used as redundant information for reasons of reliability. The divider 511 is arranged to deliver the fixed current set point $I_{n\_fix}$ equal to the total current set point $I_{tot\_ref}$ divided by the number $N_{ON}$ of elementary power sources in the ON-state:

$$I_{n\_fix}=I_{tot\_ref}/N_{ON}$$

The correction unit 512 may be based on an integral controller, a derivative controller, a proportional-integral (PI) controller, a proportional-derivative (PD) controller or a proportional-integral-derivative (PID) controller. It is arranged to deliver the variable current set point $I_{n\_var}$, the determination of which depends whether the correction unit 512 is in a steady state or a transitory state. By extension, the global current control system 510 is also said to be in the steady state or in the transitory state. In the steady state, the variable current set point $I_{n\_var}$ is determined as a function of a difference between the total current $I_{tot}$ and the total current set point $I_{tot\_ref}$ so as to minimise this difference. In the transitory state, the variable current set point $I_{n\_var}$ is determined as a function of a correction signal $S_{corr}$ provided by the scenario management unit 514. It may be equal to this correction signal $S_{corr}$.

The adder 513 receives the fixed current set point $I_{n\_fix}$ and the variable current set point $I_{n\_var}$ and delivers the global current set point $I_{n\_glob}$ as the sum of these currents:

$$I_{n\_glob}=I_{n\_fix}+I_{n\_var}$$

The scenario management unit 514 is arranged to detect a change of state among the elementary power sources 220, i.e. a change from the ON-state to the OFF-state or vice-versa. For the sake of simplicity, each value of the number $N_{ON}$ of elementary power sources 220 in the ON-state is referred to as a scenario. A change of state of at least one elementary power source 220n then leads to a change of the value $N_{ON}$ and of scenario, unless there is simultaneously the switch of some elementary power sources 220 from the ON-state to the OFF-state and the switch of the same number of elementary power sources 220 from the OFF-state to the ON-state. The scenario management unit 514 is further arranged to trigger the transitory state of the correction unit 512 for a predetermined transitory period $\tau_{trans}$ when a change of scenario is detected and to determine the correction signal $S_{corr}$ to be delivered to the correction unit 512 and used during the transitory period. The transitory period $\tau_{trans}$ is triggered by a signal $S_{trig}$. It may range for example between 5 ms and 1 s. The correction signal $S_{corr}$ is determined so that the total current $I_{tot}$ remains constant in spite of the change of scenario.

In a first embodiment, the correction signal $S_{corr}$ is determined as a function of the total current set point $I_{tot\_ref}$, the number $N_{ON}$ of elementary power sources 220 in the ON-state in the new scenario, the elementary currents $I_n$ and the number $N_{ON\_loc}$ of elementary power sources 220 in the ON-state in the new scenario associated with a local current control system 320n working in the local mode. More precisely, it may be determined as follows:

$$S_{corr}=\sum_{n=1}^{N_{ON}}\left(\frac{I_{tot\_ref}}{N_{ON}}-I_n\right)\bigg/(N_{ON}-N_{ON\_loc})$$

This formula may be equally expressed as follows:

$$S_{corr}=\sum_{n=1}^{N_{ON}}(I_{n\_fix}-I_n)/N_{ON\_glob}$$

In a second embodiment, the correction signal $S_{corr}$ does not take into account all elementary currents $I_n$ but only those of elementary power sources 220 in the ON-state in the new scenario associated with a local current control system 320n working in the local mode. The above formulas become:

$$S_{corr}=\sum_{n=1}^{N_{ON\_loc}}\left(\frac{I_{tot\_ref}}{N_{ON}}-I_n\right)\bigg/(N_{ON}-N_{ON\_loc})$$

and $$S_{corr}=\sum_{n=1}^{N_{ON\_loc}}(I_{n\_fix}-I_n)/N_{ON\_glob}$$

Figure 6:
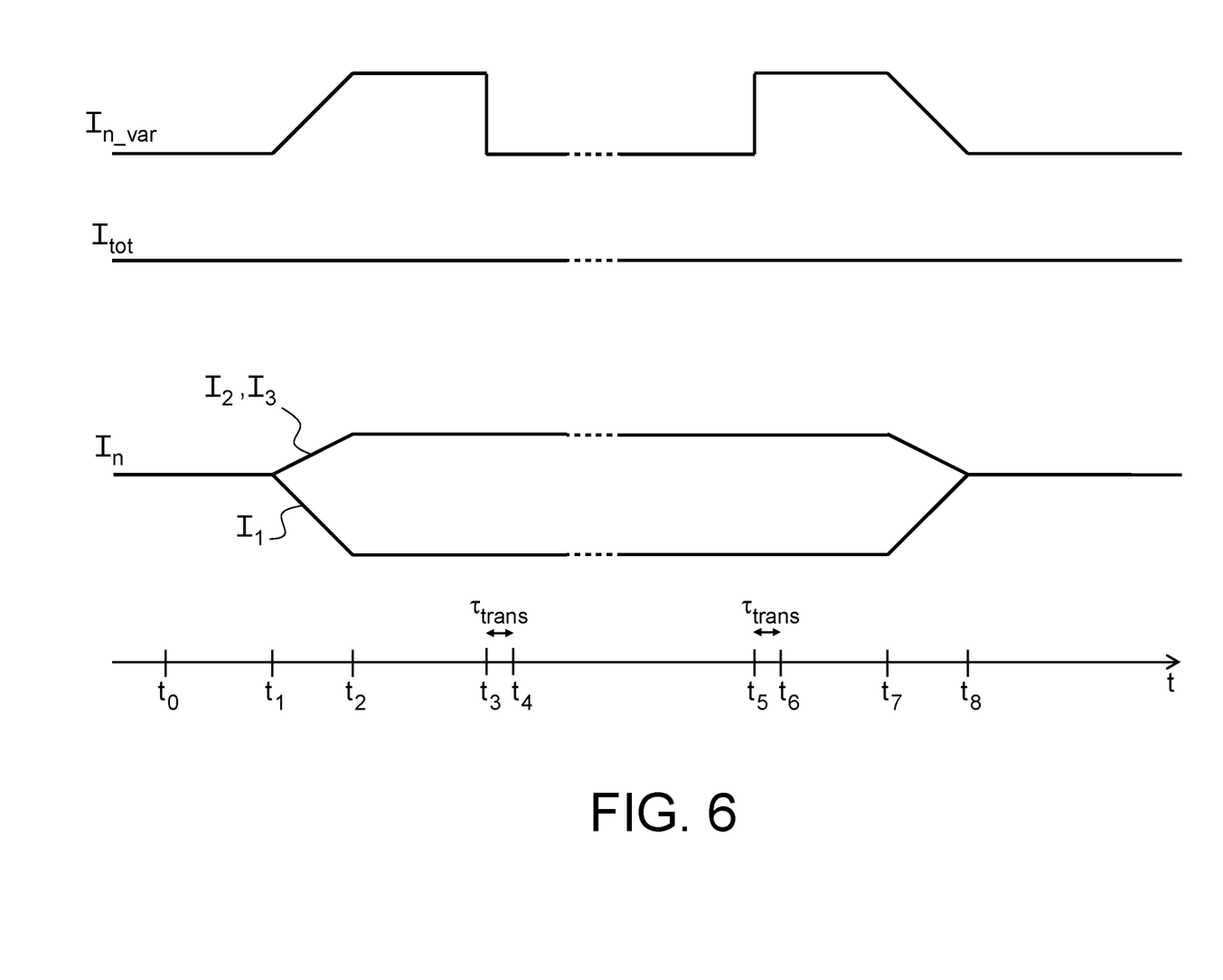
FIG. 6 is a timing diagram illustrating how the power system of FIG. 4 functions.

FIG. 6 is a timing diagram similar to that of FIG. 3 illustrating how the power system 400 according to a first embodiment of the invention functions. The same assumptions as for the timing diagram of FIG. 3 are considered. At time to, the correction unit works in the steady state. From time $t_0$ to time $t_2$, the power system 400 shows a same working. In particular, the variable set point $I_{n\_var}$ increases from 0 to 50 kA. However, when the elementary power source 2201 switches to the OFF-state at time $t_3$, the scenario management unit 514 detects the change and triggers the transitory state by means of the signal $S_{trig}$. It also recalculates the correction signal $S_{corr}$. Since there is no elementary power source in the ON-state associated with a local current control system working in the local mode ($N_{ON\_loc}$=0), the correction signal $S_{corr}$ is determined as zero ($S_{corr}$=0). The variable current set point $I_{n\_var}$ so suddenly decreases from 50 kA to 0 kA. Simultaneously, at time $t_3$, the fixed current set point $I_{n\_fix}$ suddenly increases from 100 kA to 150 kA. As a result, the global current set point $I_{n\_glob}$ remains constant at time $t_3$ ($I_{n\_glob}$=150 kA). The total current $I_{tot}$ so undergoes no disturbance. In a similar way, when the elementary power source 2201 switches at time $t_5$ to the ON-state with its associated local current control system working in the local mode, the fixed current set point $I_{n\_fix}$ suddenly decreases from 150 kA to 100 kA. The scenario management unit 514 detects the change and triggers the transitory state by means of the signal $S_{trig}$. It also recalculates the correction signal $S_{corr}$ as follows:

$$S_{corr} = \sum_{n=1}^{N_{ON\_loc}} (I_{n\_fix} - I_n)/N_{ON\_glob} = \sum_{n=1}^{1} (100-0)/2 = 50 \text{ kA}$$

The variable current set point $I_{n\_var}$ so suddenly increases from 0 kA to 50 kA. Simultaneously, at time $t_5$, the fixed current set point $I_{n\_fix}$ suddenly decreases from 150 kA to 100 kA. As a result, the global current set point $I_{n\_glob}$ remains constant at time $t_5$ ($I_{n\_glob}$=150 kA). The total current $I_{tot}$ so undergoes no disturbance.

According to a second embodiment of the invention, the power system comprises the power generation system 200 as disclosed above and a control system, not represented, mainly distinguishing from the control system 500 disclosed with reference to FIG. 4 and FIG. 5 in that the scenario management unit does not take into account the elementary currents $I_n$ for determining the correction signal $S_{corr}$. The correction unit is also arranged to deliver a variable current set point $I_{n\_var}$, the determination of which depends whether it is in a steady state or a transitory state. In the steady state, the variable current set point $I_{n\_var}$ is determined as a function of the difference between the total current set point $I_{tot\_ref}$ and the total current $I_{tot}$.

However, contrary to the first embodiment of the invention wherein the regulation of the total current $I_{tot}$ is temporarily interrupted, the regulation is maintained even in the transitory period $\tau_{trans}$. To this end, in the transitory state, the variable current set point $I_{n\_var}$ is determined not only as a function of the correction signal $S_{corr}$, but also as a function of the difference between the total current set point $I_{tot\_ref}$ and the total current $I_{tot}$. As indicated above, the elementary currents $I_n$ are not considered when determining the correction signal $S_{corr}$. The correction signal $S_{corr}$ is determined as a function of the fixed current set point in the former scenario $I_{n\_fix}(t-1)$ and the fixed current set point in the new scenario $I_{n\_fix}(t)$. For example, it is determined as follows:

$$S_{corr}(t) = I_{n\_fix}(t) - I_{n\_fix}(t-1)$$

The variable current set point $I_{n\_var}$ may be determined as follows:

$$I_{n\_var}(t) = f(I_{tot\_ref}(t)) + S_{corr}(t)$$

with f a function determined so that the difference between the total current $I_{tot}$ and the total current set point $I_{tot\_ref}$ is minimised.

In an exemplary implementation, the correction unit may deliver the variable current set point $I_{n\_var}$ as being the sum of the correction signal $S_{corr}$ and a function of the difference between the total current set point $I_{tot\_ref}$ and the total current $I_{tot}$ as well in the steady state and in the transitory state. In such a case, the correction signal $S_{corr}$ is then determined as being zero in the steady state.

This second embodiment of the invention is well suited with a power system using digital signals. In particular, the total current $I_{tot}$ and the elementary currents $I_n$ may be digitized at a predetermined sampling frequency, this frequency also determining the frequency of data processing. Preferably, the transitory period $\tau_{trans}$ is set so as to be equal to a sampling period corresponding to the sampling frequency. Then, the variable current set point $I_{n\_var}$ is corrected by a non-zero correction signal $S_{corr}$ for a single sampling period.

The invention claimed is:

1. A control system for regulating a plurality of elementary power groups in a power generation system, each elementary power group comprising an elementary power source arranged to take either an ON-state, wherein it generates an elementary current $I_n$, or an OFF-state, wherein it is not able to provide a current, the elementary power sources being connected in parallel to deliver a total current $I_{tot}$ as a sum of the elementary currents $I_n$, the control system comprising a global current control system and a plurality of local current control systems each associated with an elementary power source, the global current control system being arranged to generate a global current set point $I_{n\_glob}$, each local current control system being arranged to work either in a global mode, wherein it regulates the elementary current $I_n$ of the associated elementary power source as a function of said global current set point $I_{n\_glob}$, or in a local mode, wherein it regulates said elementary current $I_n$ as a function of a predetermined local current set point $I_{n\_loc}$, the global current control system comprising:
a divider arranged to deliver a fixed current set point $I_{n\_fix}$, the fixed current set point $I_{n\_fix}$ being equal to a total current set point $I_{tot\_ref}$ divided by a number $N_{ON}$ of elementary power sources in the ON state,
a correction unit arranged to deliver a variable current set point $I_{n\_var}$, and to take either a steady state, wherein the variable current set point $I_{n\_var}$ is determined as a function of a difference between the total current $I_{tot}$ and a total current set point $I_{tot\_ref}$ so as to minimise said difference, or a transitory state, wherein the variable current set point $I_{n\_var}$ is determined as a function of a correction signal $S_{corr}$,
an adder arranged to deliver the global current set point $I_{n\_glob}$, the global current set point being equal to the sum of the fixed current set point $I_{n\_fix}$ and the variable current set point $I_{n\_var}$, and
a scenario management unit arranged to detect a change of scenario from a former scenario to a new scenario, a change of scenario occurring when the state of at least one elementary power source switches from the OFF-state to the ON-state, or vice versa, the scenario management unit being further arranged to determine the correction signal $S_{corr}$, to deliver it to the correction unit and to trigger the transitory state of the correction unit for a predetermined transitory period $\tau_{trans}$ when a change of scenario is detected, the correction signal $S_{corr}$ being determined so that the total current $I_{tot}$ remains constant in spite of the change of scenario.

2. The control system of claim 1 wherein, in the transitory state of the correction unit, the variable current set point $I_{n\_var}$ is determined as being equal to the correction signal $S_{corr}$.

3. The control system of claim 2, wherein the scenario management unit is arranged to determine the correction signal $S_{corr}$ as follows:

$$S_{corr} = \sum_{n=1}^{N_{ON}} \left( \frac{I_{tot\_ref}}{N_{ON}} - I_n \right) / (N_{ON} - N_{ON\_loc})$$

with $N_{ON\_loc}$ the number of elementary power sources in the ON-state in the new scenario associated with a local current control system working in a local mode.

4. The control system of claim 2, wherein the scenario management unit is arranged to determine the correction signal $S_{corr}$ as a function of the differences, for each elementary power group in the ON-state associated with a local current control system working in a local mode, between its elementary current $I_n$ and the fixed current set point $I_{n\_fix}$ in the new scenario.

5. The control system of claim 4, wherein the correction signal $S_{corr}$ is determined as follows:

$$S_{corr} = \sum_{n=1}^{N_{ON\_loc}} \left( \frac{I_{tot\_ref}}{N_{ON}} - I_n \right) / (N_{ON} - N_{ON\_loc})$$

with $N_{ON\_loc}$ the number of elementary power sources in the ON-state in the new scenario associated with a local current control system working in a local mode.

6. The control system of claim 1, wherein the predetermined transitory period $\tau_{trans}$ ranges between 5 milliseconds and 1 second.

7. The control system of claim 1 wherein, in the transitory state of the correction unit, the variable current set point $I_{n\_var}$ is determined as being equal to the sum of the correction signal $S_{corr}$ and the difference between the total current $I_{tot}$ and the total current set point $I_{tot\_ref}$.

8. The control system of claim 7 wherein, in the transitory state of the correction unit, the correction signal $S_{corr}$ is determined as being equal to the difference between the fixed current set point $I_{n\_fix}(t)$ for the new scenario and the fixed current set point $I_{n\_fix}(t-1)$ for the former scenario.

9. The control system of claim 7 wherein, in the steady state of the correction unit, the correction signal $S_{corr}$ is determined as being equal to zero.

10. The control system of claim 1, wherein the global current control system is arranged to generate the global current set point $I_{n\_glob}$ at a predetermined sampling frequency.

11. The control system of claim 7, wherein the transitory period $\tau_{trans}$ is equal to a sampling period corresponding to the sampling frequency.

12. The control system of claim 10, wherein the transitory period $\tau_{trans}$ is equal to a sampling period corresponding to the sampling frequency.

13. A power system comprising:
a power generation system; and
a control system comprising an elementary power source arranged to take either an ON-state, wherein it generates an elementary current $I_n$, or an OFF-state, wherein it is not able to provide a current, the elementary power sources being connected in parallel to deliver a total current $I_{tot}$ as a sum of the elementary currents $I_n$,
the control system further comprising a global current control system and a plurality of local current control systems each associated with an elementary power source, the global current control system being arranged to generate a global current set point $I_{n\_glob}$, each local current control system being arranged to work either in a global mode, wherein it regulates the elementary current $I_n$ of the associated elementary power source as a function of said global current set point $I_{n\_glob}$, or in a local mode, wherein it regulates said elementary current $I_n$ as a function of a predetermined local current set point $I_{n\_loc}$, the global current control system comprising:
a divider arranged to deliver a fixed current set point $I_{n\_fix}$, the fixed current set point $I_{n\_fix}$ being equal to a total current set point $I_{tot\_ref}$ divided by a number $N_{ON}$ of elementary power sources in the ON state,
a correction unit arranged to deliver a variable current set point $I_{n\_var}$ and to take either a steady state, wherein the variable current set point $I_{n\_var}$ is determined as a function of a difference between the total current $I_{tot}$ and a total current set point $I_{tot\_ref}$ so as to minimise said difference, or a transitory state, wherein the variable current set point $I_{n\_var}$ is determined as a function of a correction signal $S_{corr}$,
an adder arranged to deliver the global current set point $I_{n\_glob}$, the global current set point being equal to the sum of the fixed current set point $I_{n\_fix}$ and the variable current set point $I_{n\_var}$, and
a scenario management unit arranged to detect a change of scenario from a former scenario to a new scenario, a change of scenario occurring when the state of at least one elementary power source switches from the OFF-state to the ON-state, or vice versa, the scenario management unit being further arranged to determine the correction signal $S_{corr}$, to deliver it to the correction unit and to trigger the transitory state of the correction unit for a predetermined transitory period $\tau_{trans}$ when a change of scenario is detected, the correction signal $S_{corr}$ being determined so that the total current $I_{tot}$ remains constant in spite of the change of scenario;
wherein the power generation system comprises a plurality of elementary power groups each associated with one of the local current control systems of the control system.

14. The power system of claim 13, wherein the power generation system is dedicated to deliver the total current $I_{tot}$ to a smelter or an aluminium smelter.

* * * * *